United States Patent
Price et al.

[15] 3,657,837
[45] Apr. 25, 1972

[54] FISHING FLOAT CONSTRUCTION

[72] Inventors: Kenneth E. Price, El Monte; Edwin E. Presby, West Covina, both of Calif.

[73] Assignee: Rainbow Lifegard Products Inc., El Monte, Calif.

[22] Filed: Jan. 22, 1970

[21] Appl. No.: 4,861

[52] U.S. Cl. ............................................43/43.1, 43/42.35
[51] Int. Cl. .....................................................A01k 93/00
[58] Field of Search .................43/43.1, 42.24, 42.48, 42.35

[56] References Cited

UNITED STATES PATENTS

| | | | |
|---|---|---|---|
| 2,790,187 | 4/1957 | Marconi | 43/43.1 |
| 3,103,199 | 9/1963 | Gagnon | 43/43.1 X |
| 3,038,375 | 6/1962 | Gansz | 43/43.1 X |

FOREIGN PATENTS OR APPLICATIONS

| | | | |
|---|---|---|---|
| 551,172 | 1/1958 | Canada | 43/43.1 |
| 526,146 | 3/1955 | Italy | 43/43.1 |

*Primary Examiner*—Melvin D. Rein
*Attorney*—Christie, Parker & Hale

[57] ABSTRACT

Foamed lower olefin polymers, particularly foamed low density polyethylene are used for the construction of extremely durable floats for commercial fishing nets, lobster pots and crab pots. A multi-chambered float in which a tubular inner wall is connected at its ends to a spaced surrounding outer wall and in which the inner wall is connected to the outer wall by radially extending spacing walls is used to provide a float of high buoyancy. The outer wall is convexly configured and the float manifests a substantially greater diameter at its midsection than at the ends. The float walls provide waxy surfaces of low moisture absorptivity.

3 Claims, 3 Drawing Figures

PATENTED APR 25 1972

INVENTOR.
KENNETH E. PRICE
EDWIN E. PRESBY
BY
Christie, Parker, & Hale
ATTORNEYS

FISHING FLOAT CONSTRUCTION

BACKGROUND OF THE INVENTION

In recent years expanded vinyl floats have supplanted many conventional wood and cork floats in the commercial fish and shellfish industries. Expanded vinyl floats, however, suffer several deficiencies.

Floats used near head end of a seine net, namely the end of the net connected to a seine drum of a commercial fishing vessel, are subjected to severe compressive loads when the net is paid out and brought in. Expanded vinyl floats under such loads are, in many instances, compressed to 50 percent or less of their original volume. When new, these floats return to their original volume when the compressive load is released. As use continues, however, the floats fatigue and lose their ability to return to their original volume, and as a consequence, the buoyancy originally provided is lost to a substantial degree.

The expanded vinyl floats may also be severely scored under such loads. When badly scored, the float tears and snags with the net or is torn from the net. As a consequence, expanded vinyl floats may not be economically used at the very head end of the net.

Another disadvantage, of no small consequence, is that the expanded vinyl floats are frequently partially destroyed by sea mammals. Too often the degree of destruction is sufficient to cause the float to lose its required service buoyancy and the float sinks. This results in a lost of expensive shellfish equipment when the floats are used to mark crab and lobster pots.

SUMMARY OF THE INVENTION

It has been found that floats of unusual durability and service life can be constructed from foamed lower olefin polymers, particularly foamed low density polyethylene.

Using foamed lower olefin polymers, floats of unusual rigidity and high buoyancy may be obtained by a construction which comprises a tubular inner wall adapted to receive a line rope or chain, an outer wall, connected to the opposed ends of the tubular inner wall and surrounding and spaced from the tubular inner wall between the end connections and a plurality of radially extending walls which connect the tubular inner wall and surrounding outer wall. This construction provides a multi-chambered float in which both air and foamed olefin polymer cooperate to provide buoyancy and in which buoyancy is maintained if one or more of the chambers is punctured.

Foamed olefin polymer floats provided in accordance with the practice of this invention are rigid and retain their structural shape even under the severest compressive loads, including the hydrostatic loads encountered when the floats use buoy underwater nets for trapping bottom feeding fish, and buoyancy after extended periods of severe use. In addition, the tough, smooth surface provided by foamed olefin polymers makes the floats unusually resilient to scruffing, scarring, tearing and attack by sea mammals.

DRAWINGS

DESCRIPTION

According to the present invention there is provided unusually durable, highly rigid floats of foamed lower olefin polymers for commercial fish and shellfish applications.

The foamed lower olefin polymers which may be used in the construction of floats according to the practice of this invention are foamed ethylene polymers and foamed propylene polymers. These include ethylene homopolymers, propylene homopolymers, copolymers of ethylene with minor amounts of ethylenically unsaturated comonomers polymerizable therewith and copolymers of propylene with minor amounts of ethylenically unsaturated comonomers polymerizable therewith. Among the comonomers which may be suitably polymerized with ethylene there may be mentioned propylene, butene, acrylic acid, ethyl acrylate, ethyl acetate, vinyl acetate and like. Suitable comonomers for polymerization with propylene include, among others, ethylene, butene and the like.

The preferred olefin polymers are ethylene homopolymers. The particularly preferred ethylene homopolymers are the low density polyethylenes having a density of from about 0.910 to about 0.925 and mixtures of low density polyethylene with minor amount of medium density polyethylenes having a density of from about 0.926 and about 0.940 and/or high density polyethylenes having a density of from about 0.941 to about 0.965 or more.

The lower olefin polymers employed in the construction of the floats of this invention display an ability to form tough skinned, fairly rigid, non brittle, closed cell foam structure when molded or extruded. The foams, however, do possess a degree of elasticity which allows the floats to withstand shocks and compressive loads without rupture. Further, they provide a waxy surface of low moisture absorptivity. These characteristics allow construction of chambered floats of unusual structural rigidity and resistance to compressive and abrasive forces.

Figure 1:
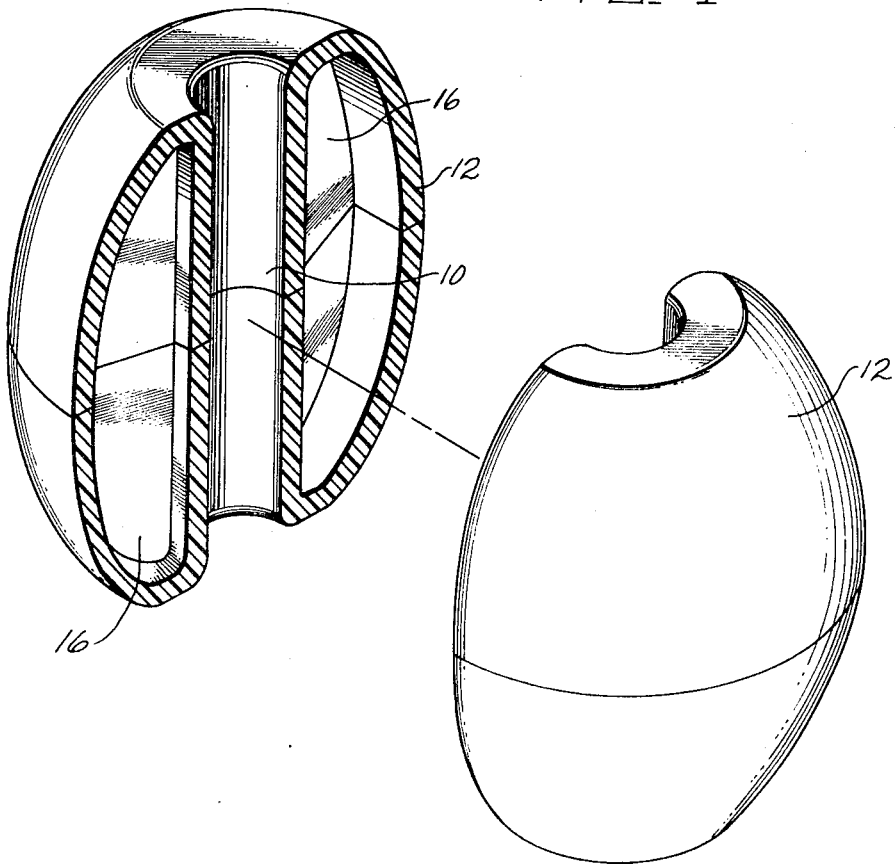
FIG. 1 illustrates a complete fishing float construction axially cut to illustrate chambered construction.

With reference now to FIG. 1 which is an axial cut of float for use on seine drum fish nets and the like, the multi-chamber floats of this invention comprise a substantially tubular inner structural wall 10 which is suitably dimensioned to receive, in slidable relation, ropes, lines, chains or the like. Outer wall 12 is connected to the tubular inner wall at the opposed ends thereof and surrounds said inner wall in spaced relation. Radially extending spacing walls 16 connect said tubular inner wall and surrounding outer wall to form a float having a plurality of chambers, each chamber being formed by the cooperation of a portion of the tubular inner wall 10, a portion of the surrounding outer wall 12 and two radially extending spacing walls 14.

Although the radially extending walls are shown projecting radially from the axis of the tubular inner wall and in complete contact with the inner wall and outer wall, it will be understood that other structural arrangements are available. The walls 16 may for instance extend at an angle to the axis of tube 10 or spiral about inner tubular wall 10. In addition, they may be formed to a length abbreviated with respect to the length of inner wall 10 so as to provide open communication between chambers. Further, they may be provided with cross walls for increased rigidity.

Figure 2:
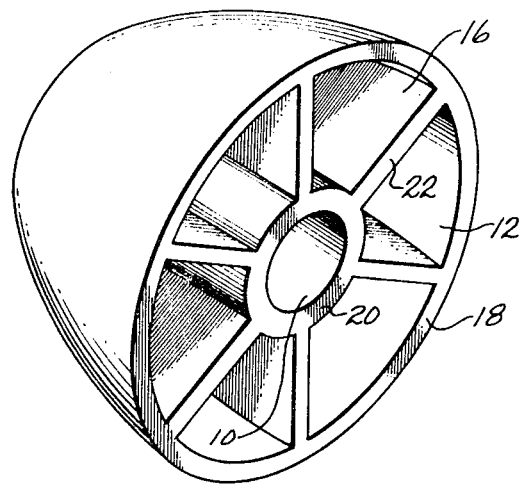
FIG. 2 illustrates a sub assembly which is one half of a fishing float.

With particular reference to FIG. 2 a float of an external configuration suitable for use as a float for fishing nets such as seine nets and the like may be prepared by molding two mating halves, each having the configuration shown in FIG. 2 and joining the halves by a suitable sealing means with the rings 18 of inner wall 12, rings 20, outer wall 14, and ribs ends 22 of radially extending walls suitably aligned to define a plurality of chambers.

Equally suitably, however, would be the insertion of a punched disc (not shown) between two halves to form a float having twice as many chambers as provided by each half of float.

Although the relative external dimensions employed in the construction of the float may vary widely, depending on the intended end use application, it has been found that employing structural wall thicknesses generally on the average of from about three-sixteenths inch to about one-fourth inch provides a float of suitable rigidity and high buoyancy which will withstand continuous service for extended periods of time.

Several distinctive advantages are available from floats constructed in the manner illustrated by FIGS. 1 and 2. Since a substantial volume of the float is air, the float is highly buoyant. For example, employing foamed low density polyethylene, a 210 gram, six chambered elliptically shaped 5 inches fishing net float having about a 2 inches minor diameter, a 4 inches major diameter, a bore diameter of an inch, and an average wall thickness of 0.25 inch, can be expected to support about 640 grams of lead without submerging.

Employing multi-chamber construction also allows one or more chambers to be punctured without a material loss in buoyancy.

The radial extended spacing walls also impart a high degree of rigidity to the float in that even at high compressive loads, compression of the float is minimal. The tough lower olefin polymers provide a low friction, waxy surface which aids in the laying of a net in a fishing area and materially resists attack from sea mammals in that, unlike the foamed vinyl floats, they experience considerable difficulty in grasping the waxy surface of the float.

Service life of such floats is unusually high even under severe conditions. For example, under controlled conditions, floats constructed of the configuration shown in FIGS. 1 and 2 attached to the very head end of a seine net remained unaffected by even the hardest service requirements at points in time and use where floats constructed of expanded vinyls failed. In addition, they did not compress or fail at the very end of the net where vinyl floats cannot be employed economically.

Based on data collected, service lives of several heavy fishing seasons may be expected whereas expanded vinyl floats under similar conditions fail in less than a fishing season.

Figure 3:
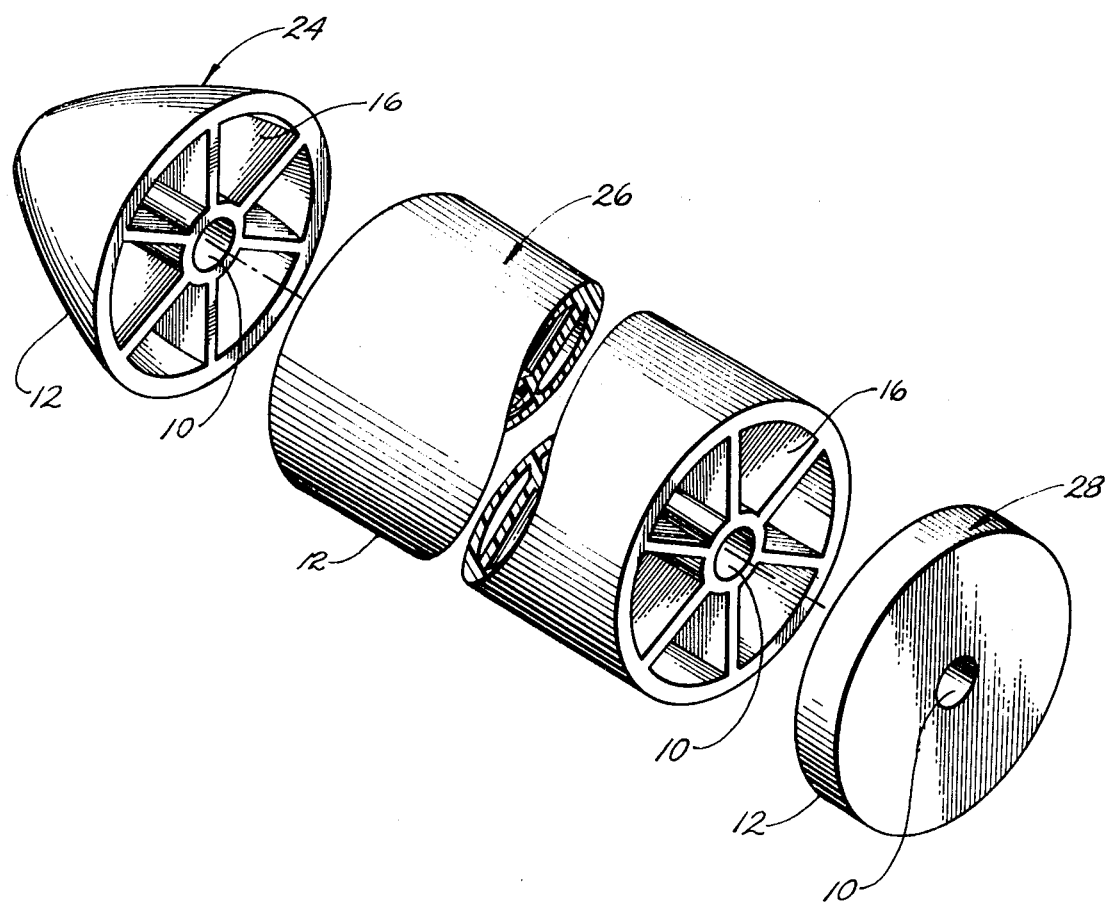
FIG. 3 illustrates one alternate float configuration available which employs the basic chambered float construction of this invention.

The basic float construction of this invention is also equally adaptive for the fabrication of lobster and crab pot floats. Lobster pot floats are basically right cylinders having a truncated conical end at one end and a closed flat end. A suitable construction for them is shown in FIG. 3. Fabrication may be from three or more pieces. Piece 24 is conical and mates with cylindrical section 26 which, in turn, is end-capped with section 28 to provide a multi-chambered float. The combined construction provides the tubular inner wall 10, the connected outer wall 12 formed by the outer walls of conical section 24, cylinder 26, and end wall 28, and the radially extended spacing walls 16 provided by the spacing walls of the conical section 24 and right cylinder 26.

A crab pot float construction may be readily achieved by substituting a conical section 24 for cap wall 28 of FIG. 3.

As will be readily appreciated, the basic sections from which a float can be constructed may be readily fabricated by a variety of means.

Elliptically shaped halves for a conventional float for a fishing net as well as conical sections for crab and lobster pots may be fabricated by conventional foam molding techniques. Typically, the lower olefin polymer already containing a suitable foaming agent such as the azo-compounds, N-nitroso compounds, sulfonyl hydrazides and the like; anti-oxidants; ultra violet absorbing agents and the like and where desired, a cross linking agent such as the peroxides, are heated in a suitable extrusion apparatus to a temperature above the melting point of the lower olefin polymers and the decompositioned or expansion temperature of the foaming agent and maintained at a pressure too high for the melt to expand. The molten lower olefin polymer is then injected in a controlled quantity less than the volume of the mold into a suitable mold at a reduced pressure at which the polymer is allowed to foam and fill the mold. Upon suitable cooling, the part can be ejected and two halves connected by conventional heat-sealing, solvent-sealing, ultrasonic welding and like measures.

Cylindrical sections such as section 16 of FIG. 3 may be molded in an identical manner or extruded continuously through a die where again the ethylene polymer melt is maintained in the extruder at a pressure which is too high to allow expansion. Upon extrusion to a shaping die the polymer is allowed to uniformly expand to provide cylindrical sections 16. The continuously formed sections may then be suitably cut to any desired length for construction of either lobster pot or crab pot floats and the like, using similar connecting measures.

For more details of such foam molding and sealing measures there is incorporated herein, by reference, "1969–1970 Modern Plastics Encyclopedia," Vol. 46, No. 10 a, McGraw-hill, Inc.

The basic float constructions may also be suitably color coded to identify the owner of the float and his fishing nets, crab pots or lobster pots.

While the novel floats of this invention have been described in terms of a novel float construction providing a multiplicity of chambers, it is to be understood that it is within the sphere of this invention to construct floats of any configuration as long as there is used for the construction of the float a foamed lower olefin polymer.

What is claimed is:

1. A chambered fishing float construction comprising:
   a. a substantially tubular inner wall;
   b. an outer wall connected to said inner wall by opposed end walls, outer wall being configured to form a symmetric convexly curved outer surface with he diameter of the float at its midsection being substantially greater than that of the ends: and
   c. a plurality of spacing walls extending radially from said inner wall and connecting said inner wall and said outer wall, said float being formed from a foamed low density olefin polymer selected from the group consisting of low density polyethylene and polypropylene polymers, and said tubular inner wall, said outer wall and said spacing walls independently having an average wall thickness of from about three-sixteenths inch to about one-fourth inch.

2. A chambered fishing float claimed in claim 1 in which the polymer is low density polyethylene.

3. A chambered fishing float as claimed in claim 1 in which the polymer is a low density polypropylene.

* * * * *